UNITED STATES PATENT OFFICE.

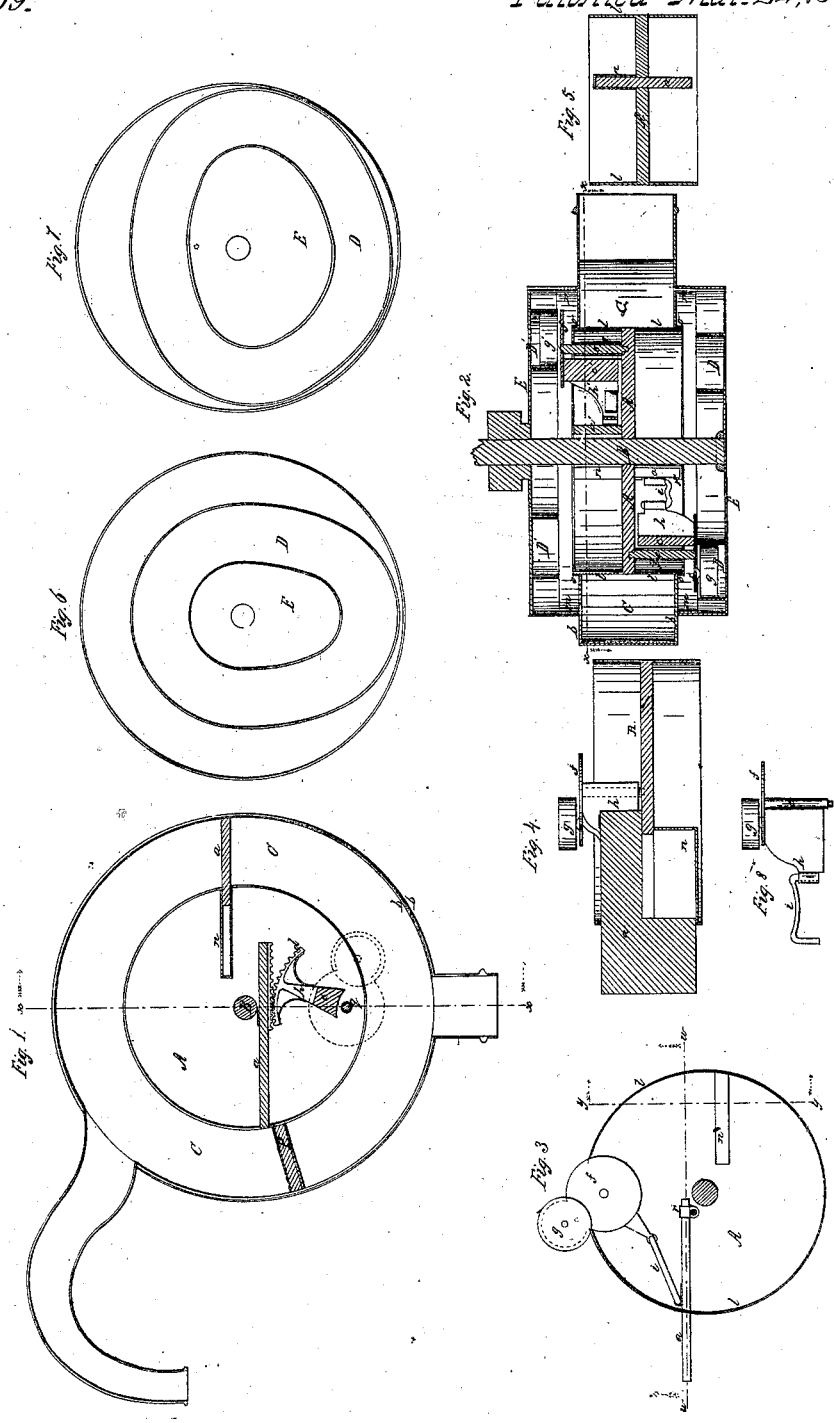

ABEL BARKER, OF HONESDALE, PENNSYLVANIA.

ROTARY PUMP.

Specification of Letters Patent No. 16,869, dated March 24, 1857.

*To all whom it may concern:*

Be it known that I, ABEL BARKER, of Honesdale, in the county of Wayne and State of Pennsylvania, have invented a new and Improved Rotary Pump; and I do hereby declare that the following is a full and exact description thereof, reference being had to the accompanying drawings, making a part of this specification, Figure 1 being a section of said pump in the line $x$ $x$ of Fig. 2; Fig. 2, a section in the line $z$ $z$ of Fig. 1; Fig. 3, a side view of the valve-box of the pump detached; Fig. 4, a section in the line $w$ $w$ of Fig. 3; Fig. 5, a section in the line $y$ $y$ of Fig. 3; Figs. 6 and 7, views of the inner faces of the sides of the pump, and Fig. 8 a view of a portion of the pump detached.

Similar letters indicate like parts in each drawing.

My improved rotary pump has two sliding valves $a$, $a'$, which are combined with a rotating valve-box placed within the center of the pump-casing. The valve-box is composed of a cylindrical casing $l$, divided into two chambers by the disk-partition A. The said valve-box is confined between the two annular and angular shaped sections $b$, $b$, of the pump case; which sections, in connection with the periphery of the valve-box, form the water way C, of the pump, as shown in Figs. 1, and 2. The said casing sections $b$, $b$, are of such a shape that they can readily be combined with each other, and when suited to each other, they hold the valve-box within their inner angles $o$, $o$, (Fig. 2,) in such a manner that the said valve-box can be freely rotated.

The sides E, E', of the pump-casing, are secured to the flanches $m$, $m$, projecting from the outer sides of the sections $b$, $b$, (see Fig. 2,) or they may be secured to said sections in any other suitable manner.

Inwardly projecting ledges on the pump sides E, E', form the cam-grooves D, D', which receive the rollers $g$, $g'$, that impart motion to the valves $a$, $a'$, through the medium of suitable mechanism.

The roller $g$, is received into the cam-groove D, and works upon a pivot which projects outwardly from the disk $f$; the pivot $e$, which projects from the center of the inner surface of the said disk $f$, is received into the tubular bearing-box $q$, which projects outwardly from the central partition A, of the valve-box. The lever $c$, $h$, which is secured to the inner surface of the said disk $f$, is connected to the valve $a$, by means of the hook $i$.

The roller $g'$, which is received into the cam groove D', works on a pivot projecting outwardly from the disk $f'$, and the central pivot $e'$, which projects inwardly from said disk, is received into the tubular bearing-box $q'$, which projects outwardly from the valve-box division plate A. The lever $c'$, $h'$, which is secured to the inner surface of the disk $f'$, is connected to the valve $a'$, by means of a toothed segment $d$, on the outer extremity of said lever, whose teeth match into ratchet teeth on the side of said valve. It will therefore be perceived that the rotation of the valve-box within the pump-casing will produce the necessary reciprocating movements of the valves $a$, and $a'$.

Between the induction aperture and the nozzle of the pump, a partition $p$, is located within the waterway C, and the side casings E, E', of the pump are secured in such positions that their cam-grooves D, and D', will cause the valves to be drawn inward just before they arrive at said partition, and then be forced outward against the outer periphery of the water-way, immediately after passing said partition; thereby causing the valves to draw water into the pump from the induction pipe and drive it out through the nozzle of the pump.

The shape of the valves $a$, $a'$, is shown in Fig. 4. Each valve, it will be perceived, has a long and a short side. The short side of each valve works in a case, or pocket, $n$, or $n'$, that embraces the slit in the division plate A, (of the valve-box) which receives said valve; the said casings, or pockets, serving the purpose of perfectly separating the valve-box chambers from each other, so that the pump can be operated with either one or with both valves. The long sides of the valves, slide upon the surface of the division-plate A, and are guided by the loops $r$, and $r'$, which project laterally from said plate.

Having thus fully described my improved rotary pump, what I claim therein as my invention and desire to secure by Letters Patent, is—

Operating the two valves thereof by means of independent attachments which are actuated by cam-grooves in the side casings of the pump, when the said valves are made to work in separate chambers in such a manner that if either valve should get out of order, the said valve and its attachments, and also the side casing on that side of the pump may be detached from the pump without interfering with the perfect action of the other valve, substantially as herein set forth.

The above specification of my improved rotary pump, signed and witnessed this 12th day of January 1857.

ABEL BARKER.

Witnesses:
GEO. W. ADAMS,
DAVID A. BURR.